United States Patent Office 3,005,810
Patented Oct. 24, 1961

3,005,810
POLYMERIZATION OF OLEFINS
Charles E. Scott, Drexel Hill, Pa., assignor to Sun Oil Company, Philadelphia, Pa., a corporation of New Jersey
No Drawing. Filed Oct. 22, 1959, Ser. No. 847,909
6 Claims. (Cl. 260—93.7)

This invention relates to the polymerization of olefins by means of a novel catalyst system. The invention more particularly concerns the polymerization of alpha-monoolefins having two or more carbon atoms per molecule to form polymers which are viscous oils or tacky solids. The polymer products have utility as additives for lubricating oils or as adhesives.

It is well known that alpha-monoolefins can be polymerized by means of aluminum halide catalysts such as aluminum chloride or aluminum bromide. The polymers that can be obtained by means of such catalysts often do not have as high molecular weight as may be desired for certain applications such as for use as lubricating oil additives to increase viscosity index or as adhesive agents.

The present invention is directed to an improvement in the use of aluminum chloride or bromide catalysts for polymerizing olefins, whereby polymers having higher molecular weight than usual are obtained. According to the invention the aluminum halide catalyst system is modified by the inclusion therein of cyclododecatriene-1,5,9. It has now been found that this compound forms a yellow colored complex with either aluminum chloride or aluminum bromide and that the complex is capable of promoting the polymerization of alpha-monoolefins into products having substantially higher molecular weights than are obtained when the cyclododecatriene-1,5,9 is omitted. The products are either viscous oils or tacky solids, depending mainly upon the particular monomer used as starting material and the reaction temperature employed. The triene incorporated in the catalyst system does not polymerize itself and hence does not appear in the polymer product.

The cyclododecatriene-1,5,9 used in preparing the novel catalyst system of the present invention can be prepared by contacting butadiene with a catalyst formed from titanium tetrachloride and diethyl aluminum chloride in a hydrocarbon solvent. This catalyst system produces the trans-trans-cis form of the triene exclusively. Cyclododecatriene-1,5,9 also can be prepared by contacting butadiene with a catalyst system which is aluminum triethyl together with either chromyl chloride or chromic chloride in a hydrocarbon solvent. The latter type of catalyst system produces mainly the trans-trans-trans form of the triene but also causes the formation of substantial amounts of the trans-trans-cis isomer. The triene product formed by either of the foregoing methods is suitable for preparing the novel catalyst system of the present invention.

In forming the new catalyst system cyclododecatriene-1,5,9 is merely admixed with either aluminum chloride or aluminum bromide suitably at room temperature. Preferably this is done in the presence of an inert organic solvent such as a saturated hydrocarbon, for example, pentane, cyclopentane, hexanes, cyclohexane, heptanes, octanes, etc. Other suitable solvents are methyl chloride, methylene chloride, ethyl chloride, ethylene chloride and sulfur dioxide. When aluminum chloride is used in preparing the catalyst system, the mixture preferably is agitated for a short time, for example, 15 minutes, to promote the complex formation between the aluminum chloride and the triene. However, when aluminum bromide is employed with a hydrocarbon or hydrocarbon halide solvent, little if any agitation is needed due to the solubility of the aluminum bromide in the solvent. As the complex between the aluminum halide and the triene forms, a characteristic yellow color develops and the catalyst system is then ready for use.

The polymerization of the olefin monomer is carried out by contacting it with the catalyst system at a temperature in the range of −50 to 100° C., more preferably 0 to 40° C. The starting monomer can be any alpha-monoolefin having 2–20 carbon atoms per molecule, for example, ethylene, propylene, butene-1, isobutylene, pentene-1, 3-methylbutene-1, 4-methylpentene-1, 1-octenes, 1-decenes and the like. Most usually an olefin monomer will be employed having 3–10 carbon atoms per molecule. Contact between the starting monomer and the catalyst system causes the monomer to polymerize into a viscous oily product or a tacky solid. The rate of polymerization depends upon the proportion of cyclododecatriene-1,5,9 to aluminum halide used, with the reaction rate decreasing as this proportion is increased. The molar proportion of the triene to the halide preferably should be at least 0.3 in order to obtain a substantial increase in the product molecular weight and preferably should not exceed 5.0 so that the rate of reaction is not unduly slow. The most beneficial molar proportions of triene to halide fall in the range of 0.5–3.0. The amount of aluminum halide that can be used in the system can vary widely, for example, in the range of .01 to 100 grams per liter of olefin monomer. Such variation in the amount of the halide component has little effect on the results obtained, provided that the ratio of triene to halide in the catalyst composition remains unchanged.

The polymerization reaction time for obtaining a desired degree of conversion of the olefin monomer will vary depending upon the particular monomer employed, the reaction temperature and the proportion of the triene to aluminum halide used. Reaction times may vary, for example, from 0.2 hour to 100 hours or longer. When the amount of triene in the system is small, reaction proceeds sufficiently rapidly to cause a substantial temperature increase. However, as the amount of triene is increased, the rate of reaction decreases to an extent such that heat release becomes unnoticeable.

The polymer formed remains in solution in the solvent employed in the system. After the polymerization reaction has been completed, the polymer can be recovered from the mixture in any suitable manner. For example, methanol can be added to the mixture to precipitate the polymer, and any solvent and methanol remaining in the separated polymer can be removed under vacuum. This procedure converts the aluminum halide in the catalyst complex into an alcoholate which remains in the solvent phase and releases cyclododecatriene-1,5,9. From the solvent phase the solvent and triene can be recovered separately by distillation and re-used in the process.

For the purpose of determining the effect of cyclododecatriene-1,5,9 (designated below as CDT) in the catalyst system under various reaction conditions, a series of runs was made in which 4-methylpentene-1 was polymerized at approximately room temperature. Both aluminum bromide and aluminum chloride were used as catalyst components with various amounts of CDT present in the system. Comparative runs were made in which the CDT was omitted. The reactions were conducted in the presence of heptane as a solvent which was employed in amount equal to the amount of starting monomer charged. Results from these runs are shown in the accompanying table. The intrinsic viscosity values listed for the polymer products were obtained in toluene solution at 40° C. and are indicative of the molecular weight of the products.

| Run No. | Halide Used | Amount of Halide [1] | Molar Ratio, CDT/ Halide | Reaction Time, hrs. | Polymer Yield, Percent | Intrinsic Viscosity |
|---|---|---|---|---|---|---|
| A | AlBr$_3$ | 10 | 0 | 1.0 | 72 | 0.07 |
| B | AlBr$_3$ | 5 | 0.5 | 1.0 | 64 | 0.14 |
| C | AlBr$_3$ | 10 | 1.0 | 18 | 78 | 0.19 |
| D | AlBr$_3$ | 10 | 2.0 | 72 | 47 | 0.27 |
| E | AlBr$_3$ | 5 | 5.0 | 72 | 5 | 0.14 |
| F | AlBr$_3$ | 5 | 100 | 72 | 0 | |
| G | AlCl$_3$ | 20 | 0 | 3.0 | 86 | 0.07 |
| H | AlCl$_3$ | 20 | 4.0 | 72 | 94 | 0.13 |
| J | AlCl$_3$ | 0.2 | 4.0 | 72 | 100 | 0.17 |

[1] Expressed in grams per liter of monomer used.

From the tabulated data it can be seen that the polymer obtained when either aluminum bromide or aluminum chloride is used alone as the catalyst has an intrinsic viscosity of 0.07, indicating a relatively low molecular weight. When CDT is added to the system, the intrinsic viscosity increases considerably, showing that a product of substantially higher molecular weight is obtained. For example, at a 2 to 1 ratio of AlBr$_3$ to CDT the intrinsic viscosity reaches a value of 0.27 or in other words increases almost four-fold over the value obtained without CDT being present. However, as shown by runs E and F, if too much CDT is included in the catalyst system, the intrinsic viscosity of the product decreases and the rate of conversion drops off until the polymerization reaction is entirely inhibited. Hence the ratio of halide to CDT generally should be maintained below 5/1. Comparison of runs H and J, in which the amount of AlCl$_3$ differed a hundred-fold, shows that variation of the amount of aluminum halide has little effect on the results obtained.

As previously indicated products prepared according to the invention can be used as additives for lubricating oil and will substantially raise the viscosity index of the oil. The can also be used as a component in grease compositions. The polymerization products which are tacky solids can be used as adhesives for laminating various sheet materials or other adhesive purposes.

I claim:
1. Method of preparing a polymer which comprises contacting an alpha-monoolefin having 2–20 carbon atoms at a temperature of —50 to 100° C. with a catalyst system comprising a complex of cyclododecatriene-1,5,9 and an aluminum halide selected from the group consisting of aluminum chloride and aluminum bromide, the molar proportion of cyclododecatriene to aluminum halide being in the range of 0.3–5.0.
2. Method according to claim 1 wherein the temperature is in the range of 0–40° C.
3. Method according to claim 1 wherein said alpha-monoolefin has 3–10 carbon atoms.
4. Method of preparing a polymer which comprises contacting 4-methylpentene-1 at a temperature in the range of 0–40° C. with a catalyst system comprising a complex of cyclododecatriene-1,5,9 and an aluminum halide selected from the group consisting of aluminum chloride and aluminum bromide, the molar proportion of cyclododecatriene to aluminum halide being in the range of 0.3–5.0.
5. A catalyst system suitable for polymerizing alpha-monoolefins which comprises a complex of cyclododecatriene-1,5,9 and an aluminum halide selected from the group consisting of aluminum chloride and aluminum bromide, the molar proportion of cyclododecatriene to aluminum halide being in the range of 0.3–5.0.
6. A catalyst system as defined in claim 5 wherein said proportion is 0.5–3.0.

References Cited in the file of this patent

UNITED STATES PATENTS 2,085,535     Langedijk et al.     June 29, 1937

OTHER REFERENCES

Thomas: "Anhydrous Aluminum Chloride in Organic Chemistry" (1941), pages 48–56.